(12) United States Patent
Desmarais et al.

(10) Patent No.: US 11,044,849 B2
(45) Date of Patent: Jun. 29, 2021

(54) TRACK HARVESTER AND METHOD

(71) Applicants: Kerry T. Desmarais, Sunnyside, WA (US); Thomas Carpenter, Jr., Granger, WA (US); Craig A. Carpenter, Granger, WA (US)

(72) Inventors: Kerry T. Desmarais, Sunnyside, WA (US); Thomas Carpenter, Jr., Granger, WA (US); Craig A. Carpenter, Granger, WA (US)

( * ) Notice: Subject to any disclaimer, the term of this patent is extended or adjusted under 35 U.S.C. 154(b) by 309 days.

(21) Appl. No.: 16/127,157

(22) Filed: Sep. 10, 2018

(65) Prior Publication Data

US 2020/0077587 A1 Mar. 12, 2020

(51) Int. Cl.
*A01D 46/02* (2006.01)

(52) U.S. Cl.
CPC .................................. *A01D 46/02* (2013.01)

(58) Field of Classification Search
CPC ...... A01D 46/02; A01G 17/02; A01G 17/023; A01G 17/026; A24B 5/06
See application file for complete search history.

(56) References Cited

U.S. PATENT DOCUMENTS

| | | | | |
|---|---|---|---|---|
| 3,437,152 A | * | 4/1969 | Barrentine | A01D 34/8355 171/58 |
| 3,499,272 A | * | 3/1970 | Looker | A01D 45/021 56/14.2 |
| 3,665,689 A | | 5/1972 | Richardson | |
| 3,962,851 A | | 6/1976 | Liepold et al. | |
| 4,204,389 A | | 5/1980 | Delfosse | |
| 5,058,369 A | * | 10/1991 | Garner | A01D 23/04 56/126 |
| 6,185,921 B1 | * | 2/2001 | Taylor | A01D 45/16 56/27.5 |
| 9,961,834 B2 | | 5/2018 | Desmarais et al. | |
| 10,334,785 B2 | * | 7/2019 | Wieker | A01D 45/30 |

FOREIGN PATENT DOCUMENTS

GB 785422 A * 10/1957 ............... A24B 5/06

* cited by examiner

*Primary Examiner* — Alicia Torres
(74) *Attorney, Agent, or Firm* — Michelle Bos Legal LLC (57) ABSTRACT

An apparatus for removing plant material from a plant body generally comprising a conveyor-stripper assembly having a pair of parallel driven endless belts, with a gap between the belts sized to allow the passage of the plant body but not the plant material growing thereon. A method for harvesting plant material from a plant body comprising pulling the plant body through a gap between two moving endless belts to strip the plant material from the plant body and convey the plant material to a collection point.

15 Claims, 12 Drawing Sheets

TRACK HARVESTER AND METHOD

BACKGROUND OF THE INVENTION

The invention claimed herein relates to the field of harvesting equipment. More particularly, the invention relates to a device for removing plant material from a plant so that the unwanted portion of the plant can be discarded and only the desirable plant material retained for processing.

The present invention is suitable for use with a variety of crops, and has been found to be particularly advantageous in harvesting hops. A variety of devices for harvesting hops are known in the art, most of which provide for the removal and transport of the entire hop bine and support twine to a central processing facility for picking. One commonly employed picking process comprises suspending the hop bine and twine from a hook for transport into a chamber to be "combed" or "raked" to strip off the leaves and hop cones. The cones are kept for drying and processing, while the leaves, arms, bine and support twine accumulate as waste. It would be advantageous to leave as much of the unusable parts of the plant as possible in the field, where they can be chopped up and disked into the soil, rather than to incur additional labor and transportation costs to transport them to a processing facility.

A limitation of known hop harvesting devices is that hop cones can be missed in the harvesting process, resulting in a lower crop yield than might be possible with a more thorough harvesting device. Another limitation of known devices is the unwanted removal of side arms from the bines when the hop cones and leaves are removed. The side arms are waste and must be separated from the hop cones during processing.

It is therefore an object of the present invention to provide an apparatus for harvesting plant material that is efficient and thorough in removing the desirable plant material from the plant body. It is an additional object of the present invention to provide an apparatus for efficiently and thoroughly removing hop cones from a hop bine while leaving the undesirable plant material on the bine. It is a further object of the present invention to provide an apparatus that can be used to harvest plant material in the field. These objectives and others are met by the invention described in the following specification, and in the accompanying drawings.

BRIEF SUMMARY OF THE INVENTION

The invention claimed and described herein comprises an apparatus for removing plant material from a plant. The apparatus generally comprises a conveyor-stripper assembly having a pair of adjacent driven endless belts, with a gap between the belts sized to allow the passage of the plant body but not the desirable plant material growing on the plant. In a preferred embodiment, the apparatus comprises an inclined conveyor-stripper assembly having a pair of driven endless belts each having an upper run, a lower run, an inside edge and an outside edge. The inside edges of the belts are in close parallel relation to one another on the upper runs, with a gap between the inside edges sized to allow passage of the plant but not the plant material. The apparatus further comprises a counter-rotating tire assembly positioned between the upper and lower runs and aligned with the gap. The tire assembly comprises two counter-rotating tires having a contact point therebetween, and is configured to grasp and continuously pull the plant body through the gap. In an embodiment, the apparatus further comprises a guide apparatus for directing the plant into the gap. The invention further comprises a method for removing plant material from a plant, wherein the plant is pulled through a gap between the inner edges of two adjacent moving endless belts having a gap therebetween sized to allow the passage of the plant body but not the desirable plant material, resulting in the separation of the plant material from the plant body.

DETAILED DESCRIPTION OF THE INVENTION

The track harvester of the present invention has applicability to a variety of crops. While the following detailed description refers to hop plants, it is to be understood that other plants may be substituted with the same result.

Hop plants grow on a trellis system comprising horizontal trellis wires supported by vertical poles. A typical hop trellis is eighteen feet high. Lengths of twine are secured to anchors in the ground and to the trellis wires above. During the growing season, the hop bine B winds around the twine as it grows up to the trellis wire, producing cones and leaves along the length of the bine. At harvest time, the hop bine and twine are severed at the lower, root end R and the upper, trellis end T in preparation for the removal of the plant material P from the bine. Preferably, the removed plant material comprises hop cones and leaves. In the description that follows, reference to the hop bine includes both the bine and the twine, as the two are not intentionally separated during field harvest.

Figure 1:
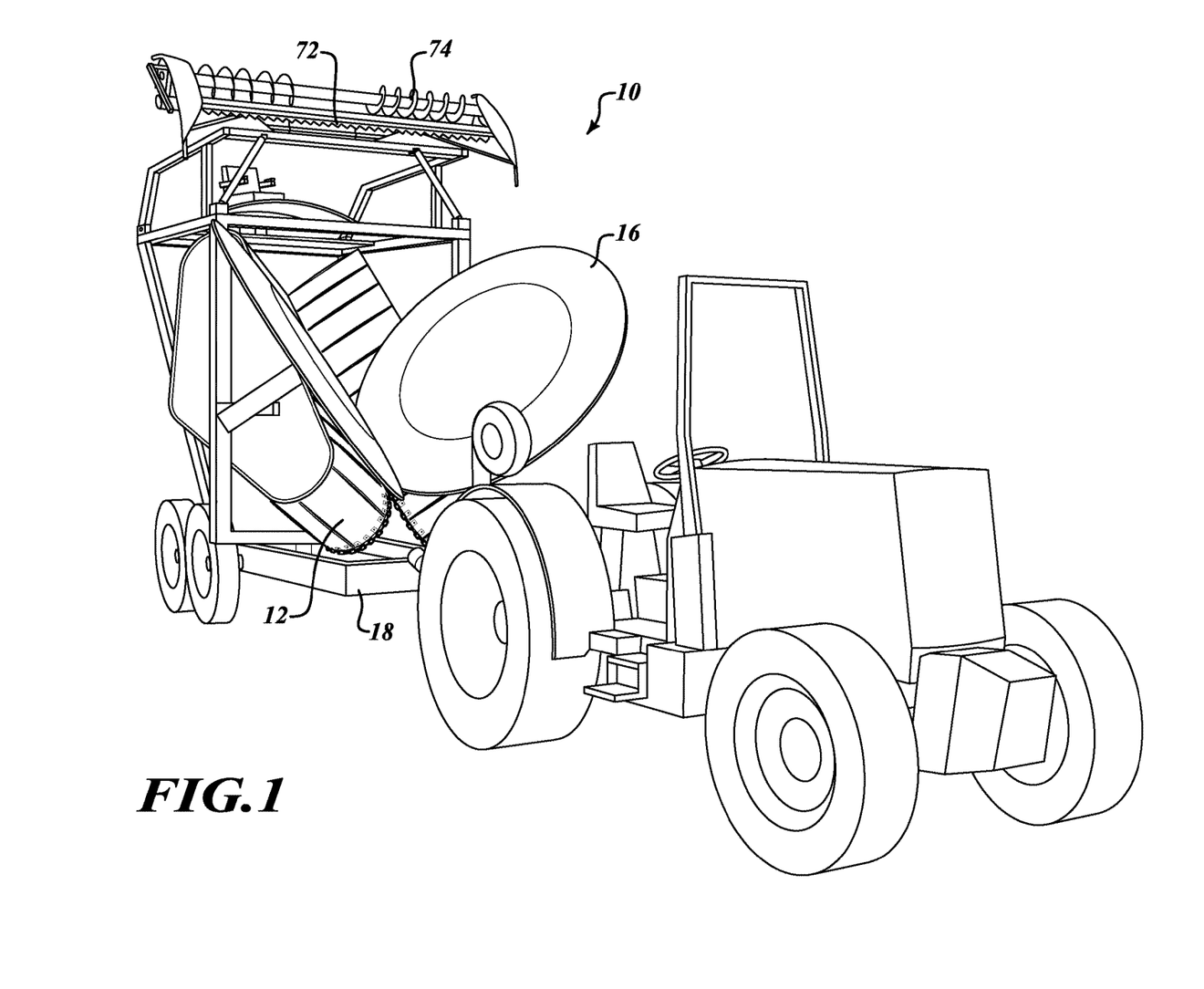
FIG. 1 is a perspective view of the track harvester of the present invention, being pulled by a tractor.
Figure 2A:
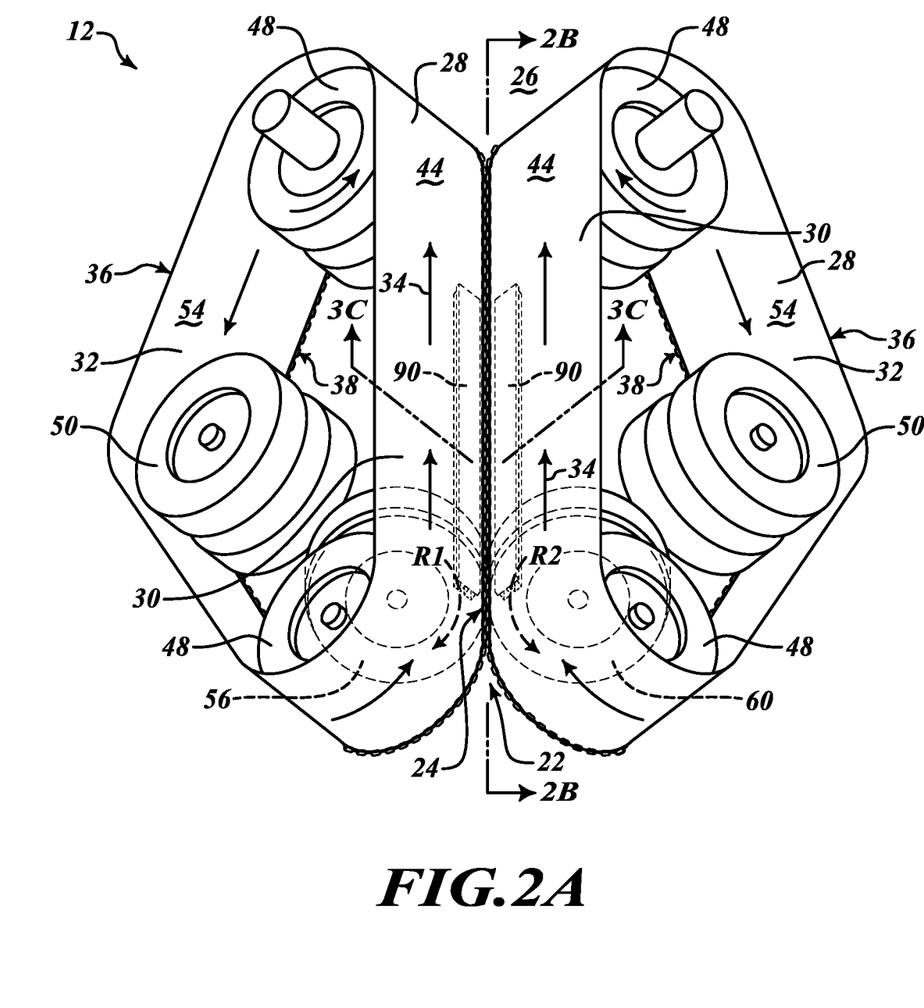
FIG. 2A is a plan view of the conveyor-stripper assembly.

A track harvester 10 is shown generally in FIG. 1. The track harvester comprises a conveyor-stripper assembly 12 as shown in FIG. 2A and a counter-rotating tire assembly 14 as detailed in FIG. 3D. In an embodiment, the track harvester further comprises a plant guide assembly 16. The track harvester 10 may be adapted to be mounted on a wheeled frame 18 and moved in a forward direction 20 through a field (see FIG. 7A) by a tractor or comparable motivational means. These components are described in detail in the following paragraphs.

Figure 2B:
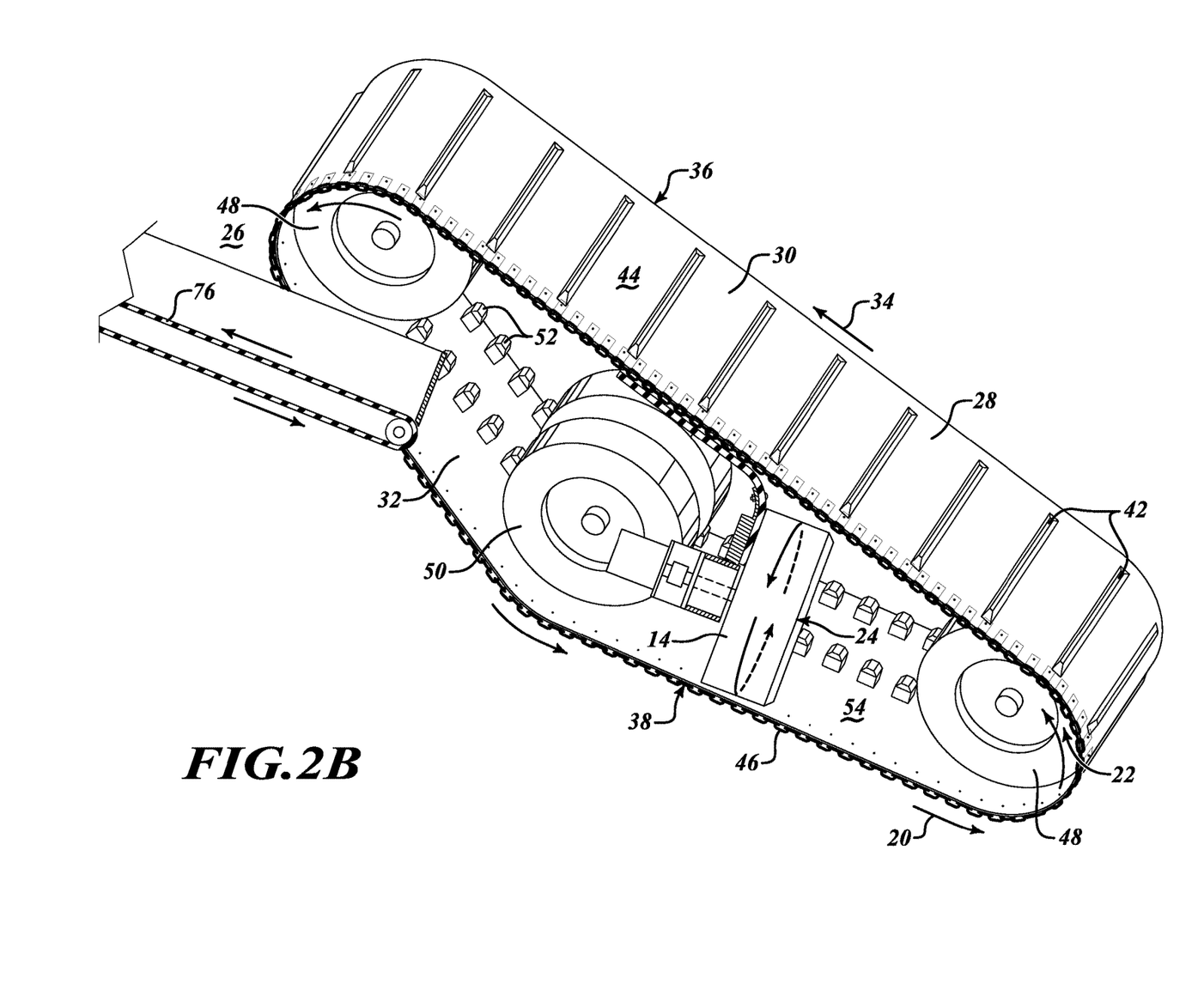
FIG. 2B is a section view of the conveyor-stripper assembly, showing the counter-rotating tires and the secondary conveyor.

The conveyor-stripper assembly 12 detailed in FIG. 2A and shown in section view in FIG. 2B is adapted to receive the root end R of a hop bine B at an entry point 22, collect the plant material P removed from the hop bine at a stripping point 24 and convey the plant material to a collection point 26. The conveyor-stripper assembly comprises a pair of driven endless belts 28, each having an upper run 30 and a lower run 32, wherein the upper run is the generally upward-facing conveying surface of the belt and is configured to convey plant material in a rearward direction 34 from the stripping point to the collection point as it is removed from the hop bine. In a preferred embodiment, the conveyor-stripper assembly is upwardly inclined from the entry point to the collection point. Each belt has an outside edge 36 and an inside edge 38. The belts are preferably arranged in a "V" shaped configuration relative to one another, to form a channel wherein the inside edges of the belts form the vertex of the "V" as shown in FIG. 3C. In a preferred embodiment, the angle of the "V" is approximately ninety degrees; however, the angle may be varied substantially as needed to accommodate the crop and equipment size and configuration. The belt inside edges run parallel to one another along the upper run, as shown in FIG. 2A. A gap 40 between the inside edges of the belts, as illustrated in FIG. 3C, is sized to allow the passage of the hop bine but not the plant material. Means for adjusting the width of the gap at the entry point may be provided.

The belts 28 are made from a durable material suitable for withstanding continuous heavy use in field conditions, such as reinforced rubber or other material known in the art. In an embodiment, each belt has a plurality of cleats 42 protruding from the outer surface 44 of the belt, oriented transversely across the width of the belt to help carry plant material P up the upper run 30 and prevent it from sliding down the belt.

In an embodiment of the invention, the inside edge 38 of each belt 28 is scalloped, or contoured. In a preferred embodiment the scalloped edge is a link chain 46 affixed along the inside edge, as shown in FIG. 2B. The scalloped edge has no sharp points or angles that might cut or break a hop bine. Although particular success has been achieved using a rounded link chain to create a scalloped edge, it is contemplated that the same effect could be achieved using alternative materials or attachments, such as rounded plates, blunt teeth or the like.

Drive wheels 48 and tensioning wheels 50, detailed in FIGS. 2A, 2B, 3A and 3B, are provided to advance the belts 28. Power is provided to at least one of the drive wheels for each belt, and drive wheel alignment guides 52 are provided on the inner surface 54 of the belts for keeping the belts in proper alignment relative to the drive wheels and each other.

Figure 3A:
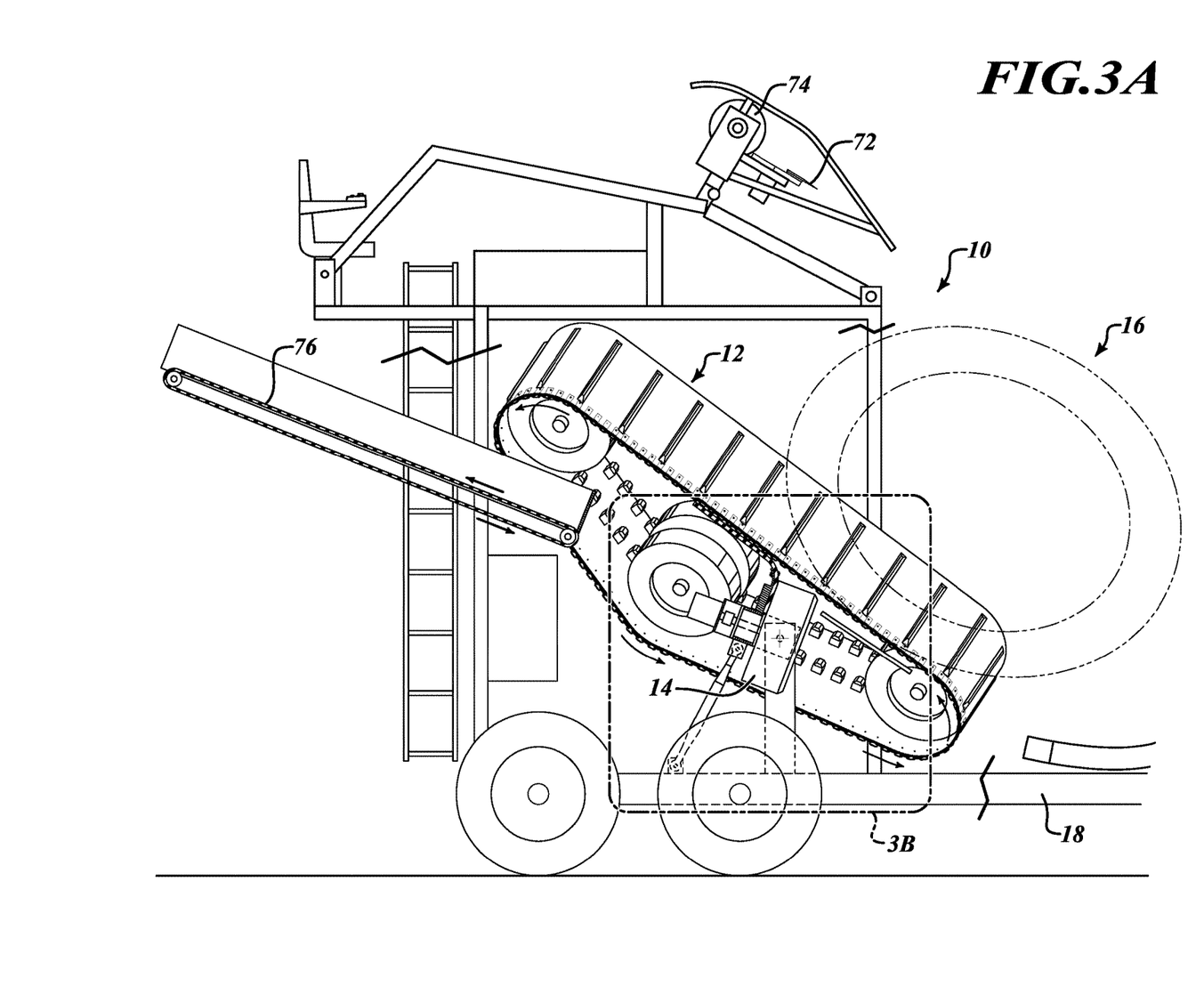
FIG. 3A is a side view of the track harvester.
Figure 3B:
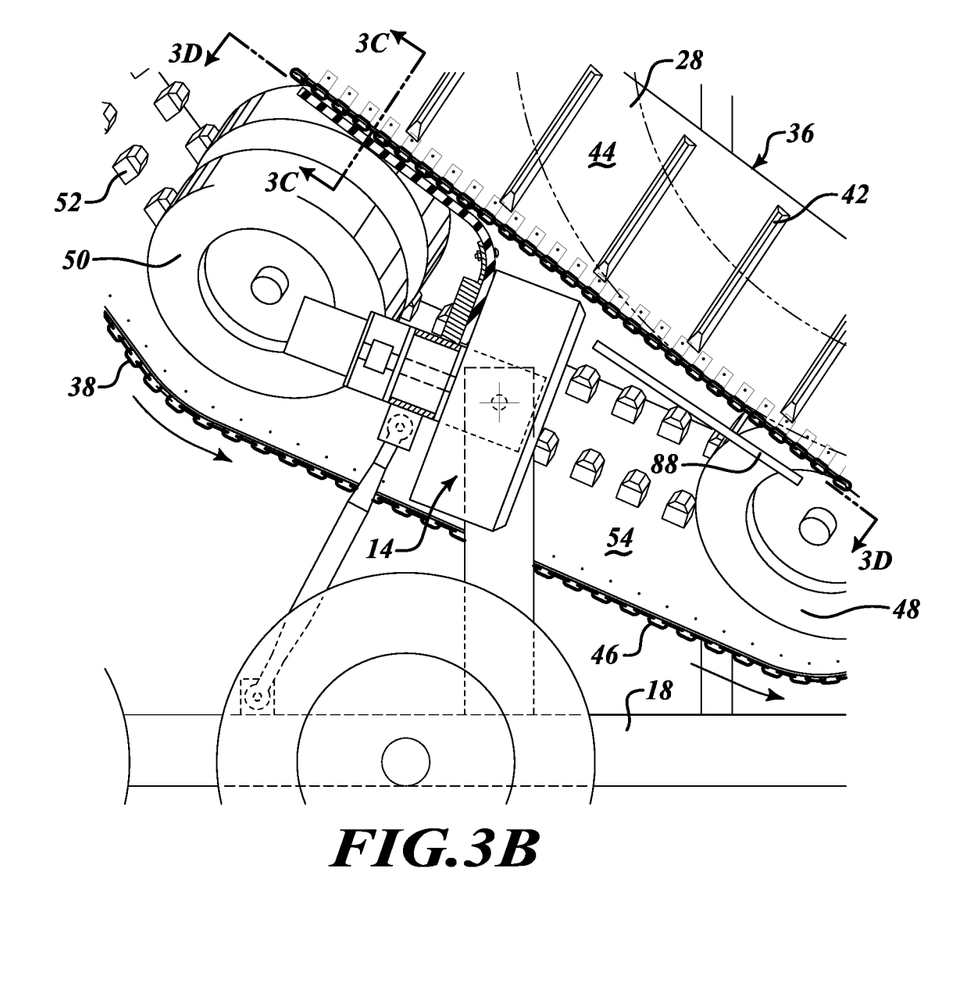
FIG. 3B shows enlarged detail of a side view of the track harvester.
Figure 3C:
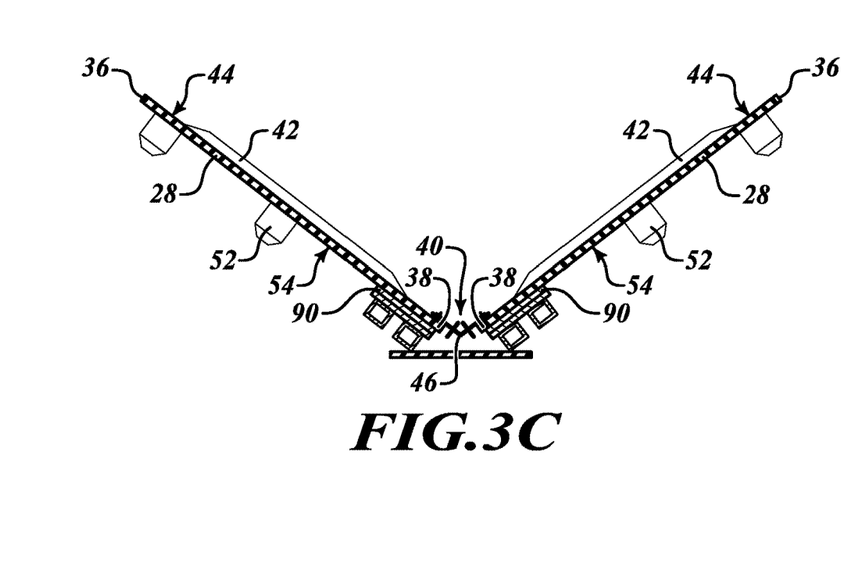
FIG. 3C is a front section view of the conveyor-stripper assembly.
Figure 3D:
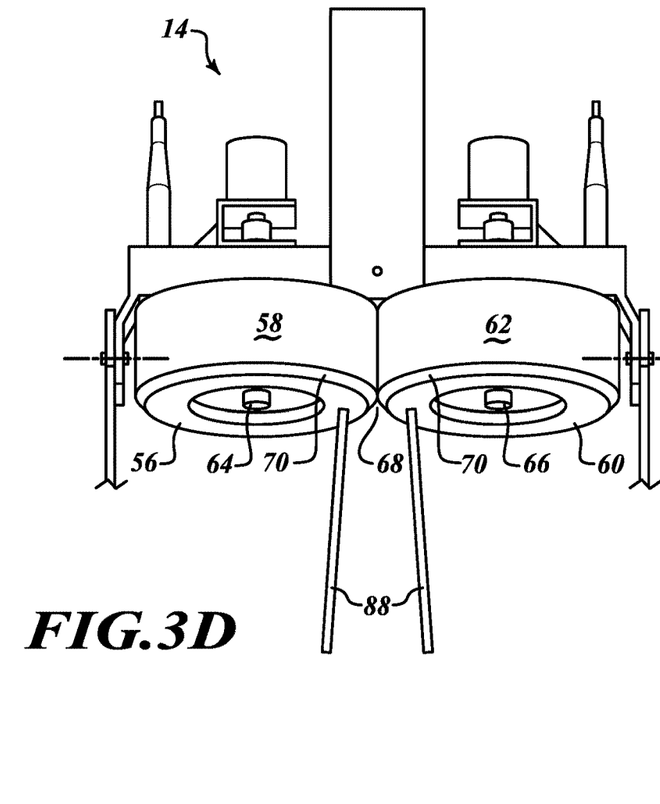
FIG. 3D shows the counter-rotating tire assembly.
Figure 4:
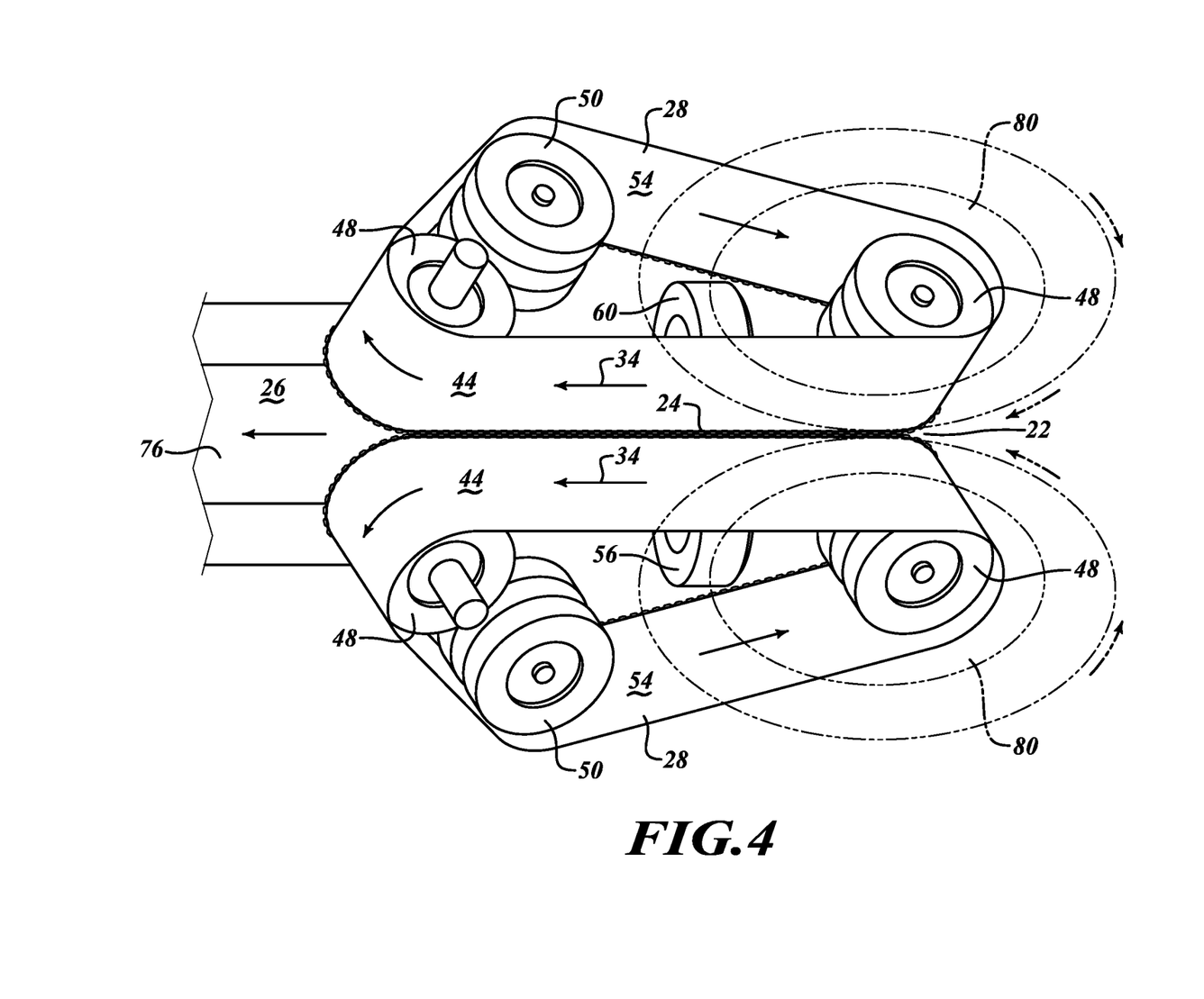
FIG. 4 is a top view of the track harvester.

FIG. 3D details a counter-rotating tire assembly 14 for pulling a hop bine B through the gap 40 in the belts 28. The counter-rotating tire assembly is mounted below the upper run 30 and centered under the gap 40 between the belts 28, as shown in FIGS. 2A and 2B. In the preferred embodiment shown in the drawings, the counter-rotating tire assembly includes a first tire 56 having a first contact surface 58, and a second tire 60 having a second contact surface 62. In a preferred embodiment, the tires are pneumatic tires mounted on conventional wheels. Pneumatic tires are preferred because the pressure in the tires can be adjusted to an optimum level for grasping, but not breaking, a hop bine. Particular success has been achieved with a treadless contact surface. However, any tire or equivalent having a pliable contact surface could be used in place of the pneumatic tire and wheel as described and shown herein, and is considered to be within the scope of the invention.

The first tire 56 and the second tire 60 are rotatably secured on first axle 64 and second axle 66, respectively. The first axle 64 and the second axle 66 are parallel to and spaced apart from one another, such that the contact surfaces 60 and 62 of the tires 56, 60 are compressed against one another in substantially full contact at a contact point 68 as shown in FIG. 3D. The contact point is aligned with the gap 40 in the belts 28 as shown in FIG. 2A.

The compression of the counter-rotating tires 56, 60 against one another is critical to the function of the hop harvesting apparatus. As will be described more fully below, the counter-rotating tires are rotated at relatively high speed to grasp and grip the hop bine B between the tires, providing strong, continuous pulling force to draw the bine lengthwise through the gap 40 in the belts 28. The grip on the hop bine must be secure and not disposed to slipping or crushing the bine. The gripping force of the tires is adjustable by increasing or decreasing the pressure in the tires. At the appropriate pressure, the surface of the pneumatic tires will conform to accommodate the shape of the hop bine while still gripping it securely as the tires are rotated and plant material is stripped away at the gap.

The purpose of the counter-rotating tire assembly 14 is to grasp and pull the hop bine B through the gap 40 between the belt inside edges 38. In order to accomplish this pulling action, the first tire 56 is rotated in a first direction $R_1$, and the second tire 60 is rotated in a second direction $R_2$, opposite the first direction. The counter-rotation of the tires is best shown in FIG. 2A, wherein it can be seen that the first tire is rotated in a clockwise direction, and the second tire is rotated in a counter-clockwise direction. The result of the counter-rotational relationship of the tires is that at the contact point 68 both wheels are rotating down and away from the gap 40.

In an embodiment, the first tire 56 and the second tire 60 each have a chamfered leading edge 70 as shown in FIG. 3D. Together the chamfered leading edges form a notch which, in use, facilitates the entry of the hop bine B at the contact point 68 as will be discussed further below.

Figure 5:
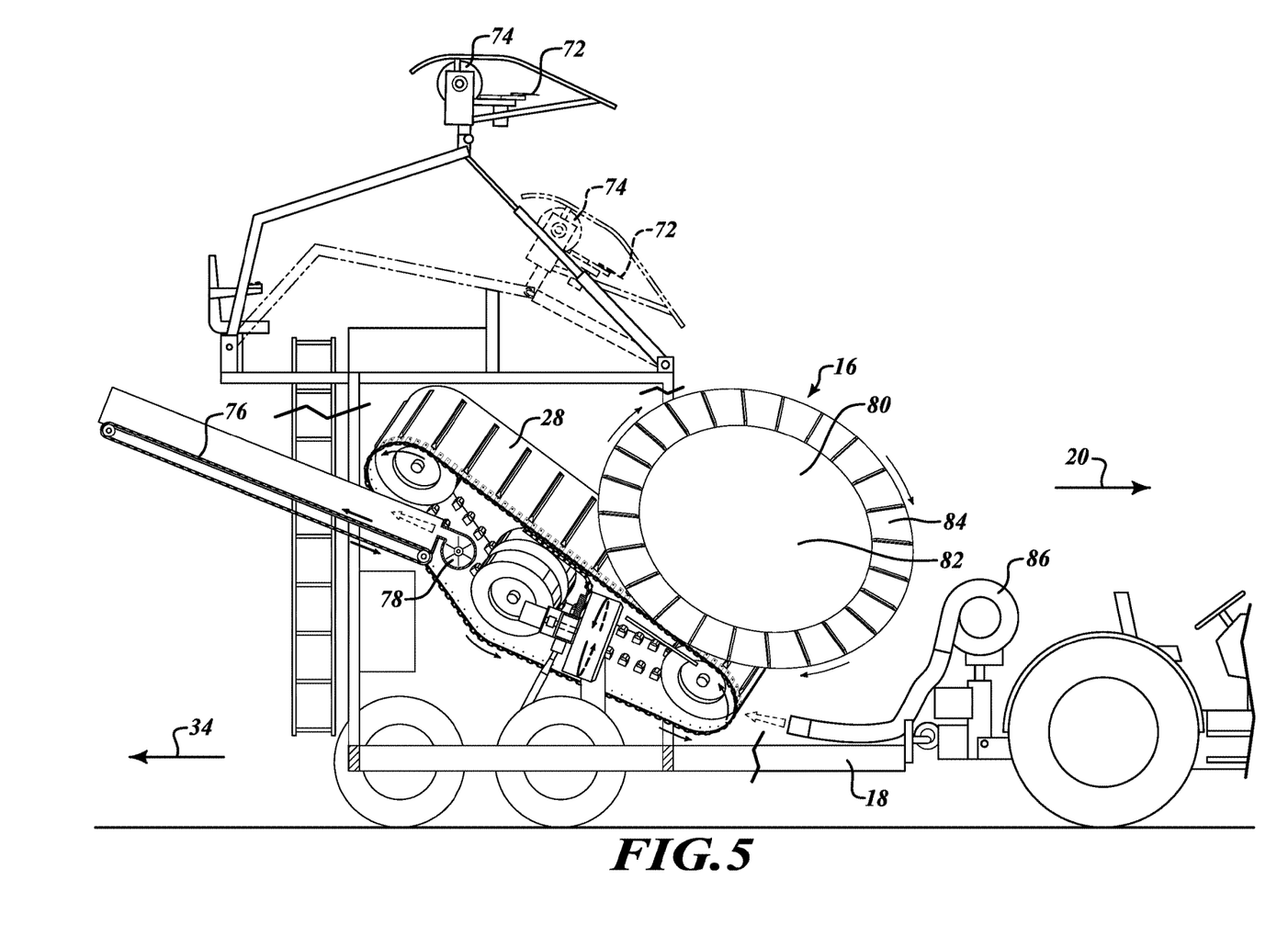
FIG. 5 is a side section view of the track harvester.
Figure 6:
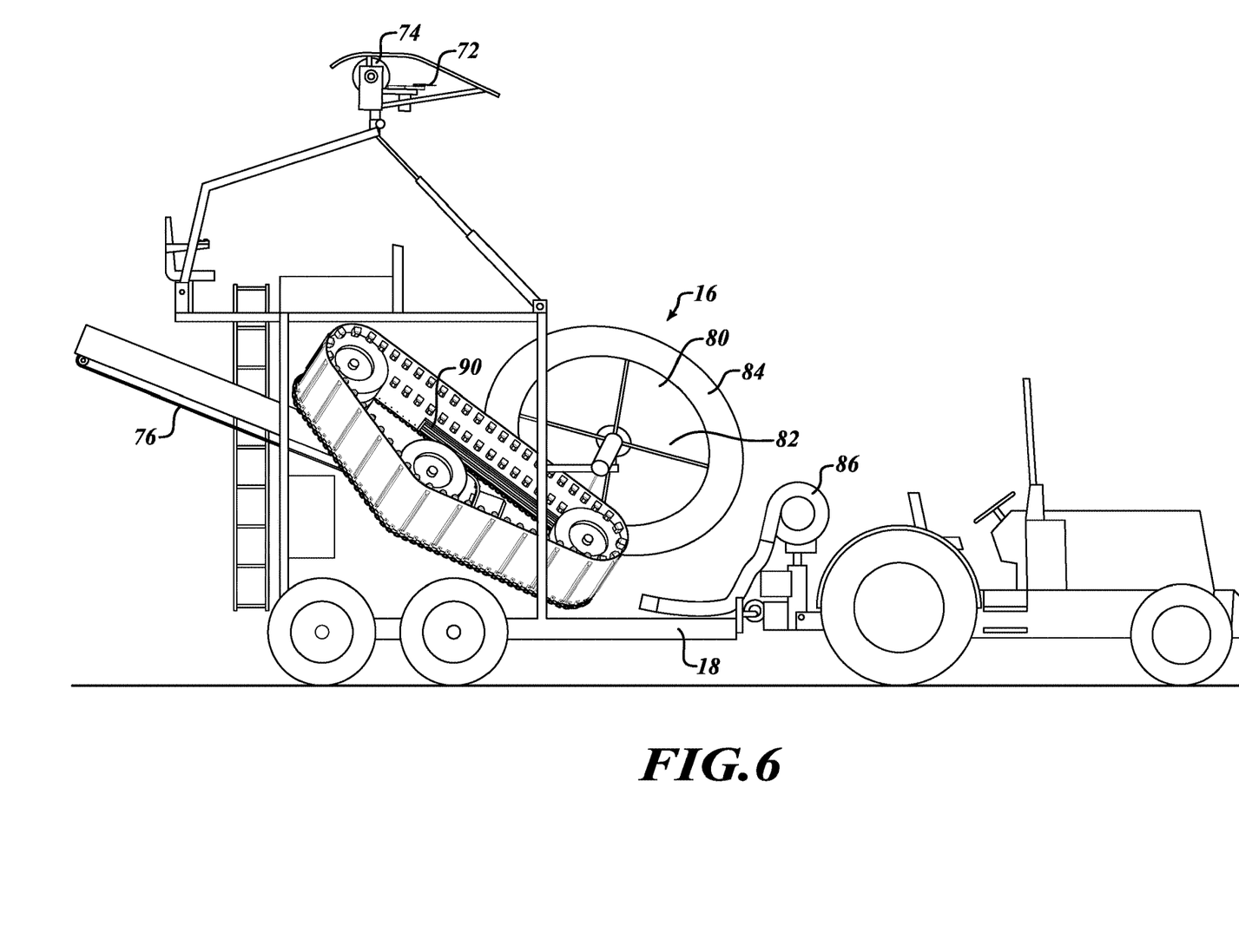
FIG. 6 is a side view of the track harvester and tractor.

In an embodiment of the invention, a top cutter 72 of the type known and used in hop harvesting equipment, as shown in FIG. 1, is mounted on the wheeled frame 18 for severing the hop bine near the trellis end T at the appropriate point in the harvesting process, as described below. The top cutter may be adjustably mounted to allow it to be raised and lowered for transport, use and storage, as shown in FIG. 5. In an additional embodiment, a bottom cutter (not shown) may also be provided for severing the hop bine B at the root end R. Although the top and bottom cutters provide the advantage of more complete automation of the harvest process, they are not required elements of the present invention.

Another optional element of the track harvester 10 is a trellis wire roller 74, as shown in FIG. 1. The roller is an auger-type rotatable roller that is adapted to engage and move the upper hop trellis wires over the track harvester so that the trellis end T of the hop bine B can be cut by the top cutter 72. In an embodiment, the trellis wire roller is mounted above the top cutter, and can be raised and lowered for transport, use and storage as detailed in FIG. 5 and described above.

Figure 7A:
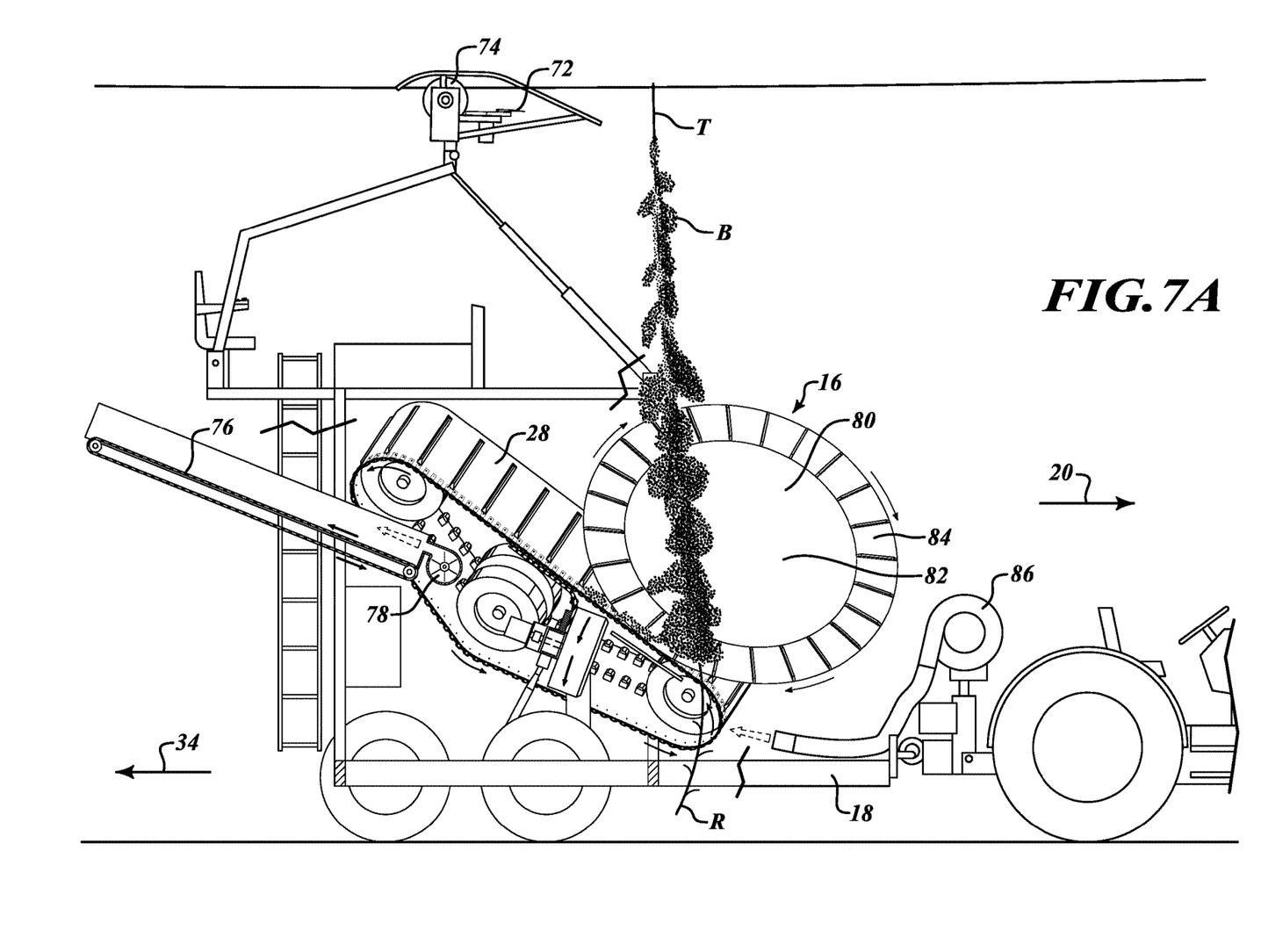
FIG. 7A is a side section view of the track harvester, shown with a hop vine entering the conveyor-stripper assembly.
Figure 7B:
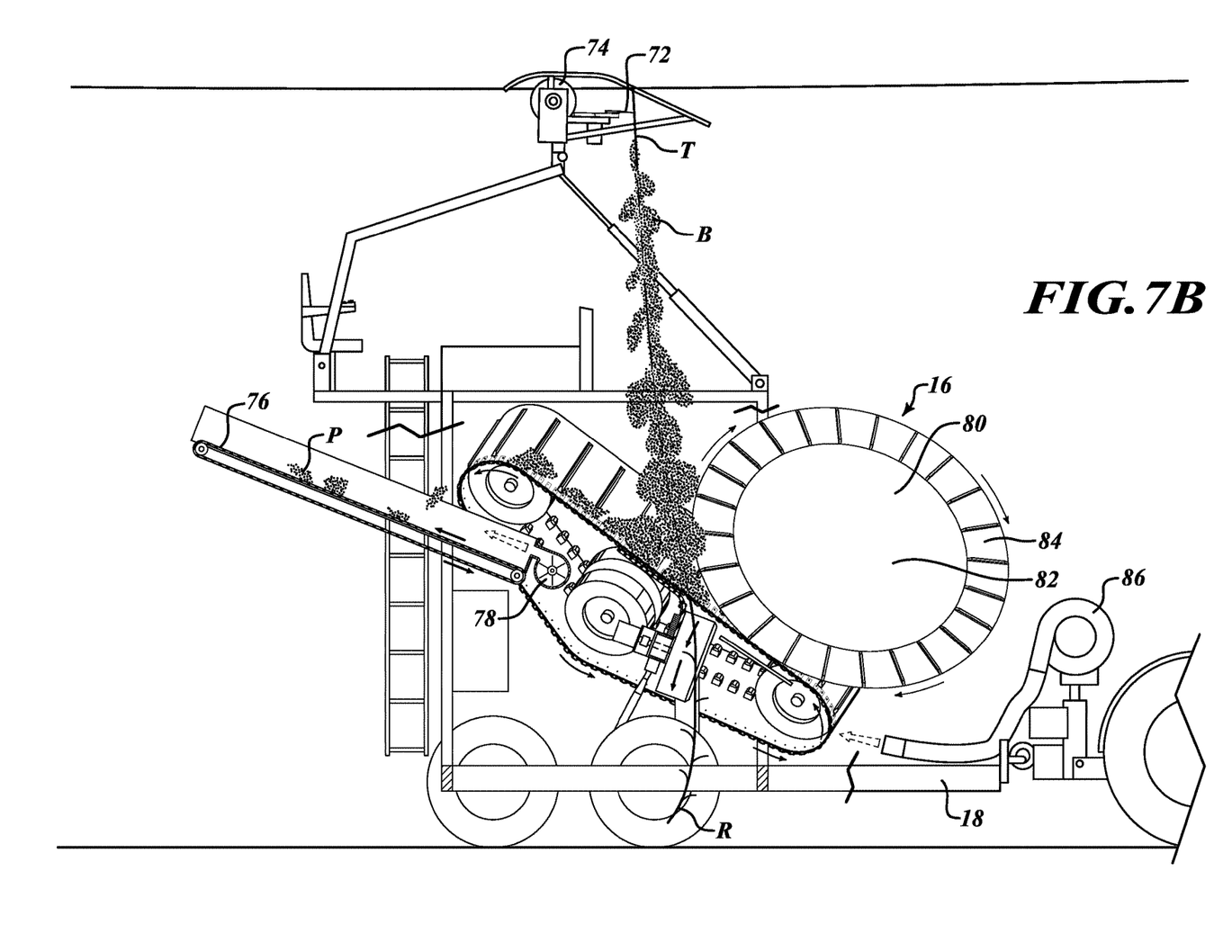
FIG. 7B is a side section view of the track harvester, with a partially stripped hop vine engaged in the counter-rotating tires.
Figure 7C:
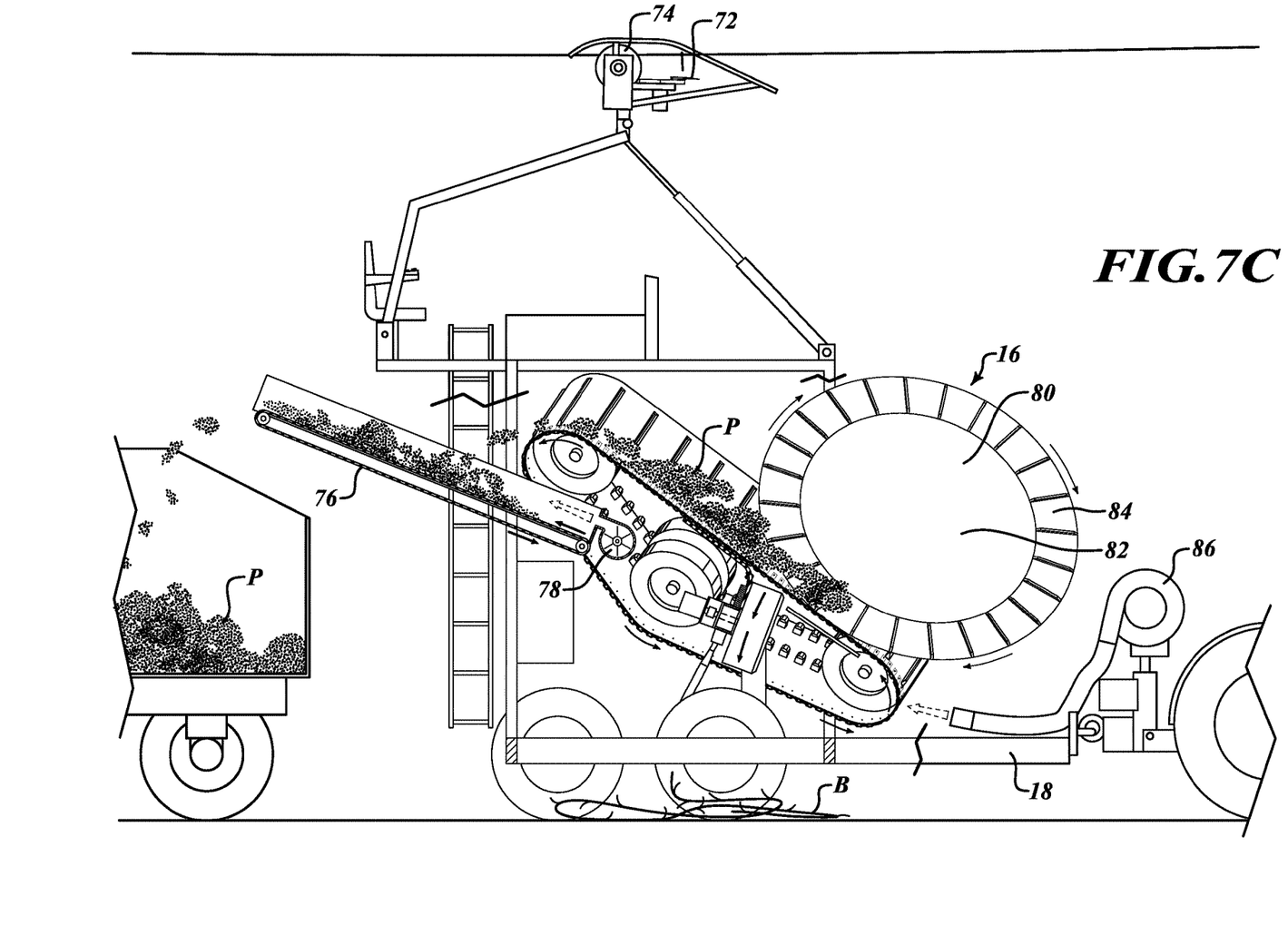
FIG. 7C is a side section view of the track harvester, with plant material on the belts and secondary conveyor, and a stripped hop vine on the ground.

In an embodiment of the invention, the track harvester 10 further comprises a secondary conveyor 76 for collecting harvested plant material P near the collection point 26 at the upper end of the belts 28, and further conveying the plant material to a truck, trailer, bin or other repository for storage or transport to a processing facility, as shown in FIGS. 7A, 7B and 7C. An output blower 78 may be provided proximate the secondary conveyor for generating a stream of forced air to prevent the harvested plant material P from falling off the secondary conveyor as is it transported to the repository.

In an embodiment of the invention, the track harvester 10 further comprises a plant guide assembly 16 for gathering hanging hop bines B that have been severed at the root end, and urging them toward the gap 40 of the conveyor-stripper assembly 12. The guide assembly is preferably on the wheeled frame 18 mounted near the entry point 22. FIG. 5 illustrates an embodiment of a guide assembly comprising a pair of rotatable guide plates 80 mounted forward of the conveyor-stripper assembly. Preferably, each guide plate comprises a substantially planar, circular center portion 82 with a pliable outer edge 84 extending from the circular center portion, and is adapted to rotate as indicated by the directional arrows shown in FIG. 5. The guide plates are oppositely arranged over the lower ends of the belts 28, forward of the stripping point 24 and approximately co-planar with the belts. The outer edge of each guide plate is proximate the gap. The guide plates extend beyond the belts to form a chute of progressively narrowing width to guide a hanging hop bine B into the gap 40 between the belts.

In an additional embodiment, a source of forced air directed rearwardly toward the gap 40 is provided for urging the hop bines toward the gap. The blower 86 shown in FIGS. 5 through 7C is a representative source of forced air.

FIGS. 3B and 3D show guide rails 88 positioned beneath the upper run 30 of each belt 28, near the entry point 22. The guide rails may be provided in an embodiment of the invention to guide and position the hop bine B as it enters the gap 40 so it can be taken up by the counter-rotating tire assembly 14.

In an embodiment, a belt support table 90 as shown in FIGS. 2A and 3C is provided immediately beneath the upper run 30 of each belt 28. A small gap, typically about one inch, is preferably left between the belt inner surfaces 54 and the upper surface of the belt support tables. The belt support tables limit the flexing or sagging of the inside edges 38 of the belts, which would cause the gap 40 between the belts to widen, thereby diminishing the stripping functionality of the belts. However, it has been found that controlled flexing of the inside edges of the belts is advantageous. In a preferred embodiment, the chains 46 substantially fill the gap between the inside edges 38 of the belts. When a smaller bine or plant body is pulled through the gap, it fits between the chain links and the stripping action is successful. A thicker bine or plant body, however, may become stuck in the gap and break off. Limited flex results in a slight widening of the gap, permitting the bine or plant body to pass through without breaking.

Power is supplied to the track harvester 10 through hydraulics or other means known in the art. Preferably, a tractor is used to advance the track harvester 10 and wheeled frame 18. The power take off on the tractor supplies hydraulic power to the counter-rotating tire assembly 14, endless belt drive wheels 48, top cutter 72, bottom cutter, secondary conveyor 76, rotating guide plates 80 and blowers 78 and 86. An electronic hydraulic valve manifold (not shown) is preferably employed to regulate and monitor the hydraulic power supply.

In use, the track harvester 10 rapidly and thoroughly removes most of the plant material P from a hop bine B and conveys the plant material to the collection point 26, while ejecting the stripped hop bine. See FIGS. 7A, 7B and 7C.

The process of removing plant material from an unstripped hop bine B using the track harvester 10 begins by severing the root end R of the bine so the bine hangs substantially vertically from the trellis wire, as shown in FIG. 7A. The step of severing the root end of the bine is carried out by a mechanized or human-powered bottom cutter.

Power is supplied to the belt drive wheels 48 to continuously advance the belts 28, moving the upper run 30 in a rearward direction 34 from the lower stripping point 24 to the higher collection point 26. Power is simultaneously supplied to the counter-rotating tire assembly 14 to continuously and quickly rotate the tires 56, 60. In a preferred embodiment, power is also supplied to rotate the guide plates 80.

In use, a hop bine B (or other plant) and the track harvester are brought into relative proximity so that the hop bine can be received into the conveyor-stripper. Preferably, this is accomplished by advancing the track harvester 10 along a row of hop bines; however, advancing the hop bines toward a stationary track harvester would elicit the same result, and although a less practical use, is considered to be within the scope of the invention. Preferably, the track harvester is advanced in a forward direction 20 on the wheeled frame 18 by a tractor or other motivational force. The pace of advancement should be about the same speed as, or slightly slower than, the advancement of the belts 28. As the track harvester advances, the root end R of the hanging unstripped hop bine B approaches the entry point 22 of the gap 40, as shown in FIG. 7A. In a preferred embodiment the unstripped hop bine is guided into the gap by the guide assembly 16 and the guide rails 88. Alternatively or additionally, the blower 86 may be used to help guide the unstripped bine into the gap. The unstripped bine may alternatively or additionally be guided by a worker stationed nearby.

The root end R of the hanging hop bine B is engaged between the inside edges 38 of the belts 28 at the entry point 22 as the track harvester 10 advances. As the belts continue to advance in an upward and rearward direction 34, the dangling, substantially vertical root end of the unstripped bine is brought toward the counter-rotating tire assembly 14 until it reaches the contact point 68, as shown in FIG. 7B. The hop bine is taken up between the tires 56, 60 at the contact point, and the hop bine begins to be pulled through the gap. In an embodiment, the notch formed by the chamfered leading edges 70 of the tires helps guide the hop bine into the tires. Concurrent with this motion, the trellis end T of the unstripped bine is cut to free the unstripped bine from the trellis. The cutting step may be accomplished by a mechanized top cutter 72 or human-powered cutter as described above.

Plant material P on the unstripped hop bine B is too bulky to pass through the gap 40 between the belts 28, and is therefore detached from the hop bine by the inside edges 38 of the belts 28 as the counter-rotating tire assembly 14 continuously pulls the hop bine in a substantially downward direction. The detached plant material remains on the upper run 30 of the belts and is conveyed upwardly and rearwardly to the collection point 26 while the hop bine is pulled through the gap until the entire hop bine is stripped clean and the stripped bine is ejected below the counter-rotating tire assembly 14, as shown in FIG. 7C. The stripping process occurs rapidly; under ideal conditions, an 18-foot hop bine is stripped in a few seconds.

It has been found that the stripping action of the belts 28 is effective in removing hop cones and leaves from the hop bine B while leaving the side arms, a waste product, attached to the hop bine for disposal. This unexpected result of the stripping process has the desirable result of cleaner harvested plant material P and more efficient secondary processing. An additional advantage of the process is that the plant material sustains very little damage during this stripping process. This is due to the "self-cushioning" effect that results as the bine passes through the gap 40. The plant material accumulates on the belts, forming a cushion against which additional plant material is pressed as the bine is pulled through.

The steps described above for using the track harvester 10 may be used to harvest crops other than hops.

In compliance with the statutes, the invention has been described in language more or less specific as to structural features and process steps. While this invention can be embodied in different forms, the specification describes and illustrates preferred embodiments of the invention. It is to be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims.

We claim:

1. An apparatus for removing plant material from a hop bine, comprising:
   a conveyor-stripper assembly comprising a pair of adjacent endless belts, each belt having an inside edge, with a gap between the inside edges sized to allow the passage of the hop bine but not the plant material; and,
   means positioned below the belts for grasping and continuously pulling the hop bine downwardly through the gap, wherein the grasping and pulling means is a pair of counter-rotating tires.

2. The apparatus of claim 1, wherein each of the counter-rotating tires has a contact surface, and the tires are mounted in such a way as to place the contact surfaces in substantially full compressed contact.

3. The apparatus of claim 1, wherein the conveyor-stripper is inclined.

4. The apparatus of claim 1, wherein the endless belts are arranged in a "V" shaped configuration relative to one another, with the gap between the inside edges of the belts at the vertex of the "V".

5. The apparatus of claim 4, wherein the gap has a lower end and an upper end, and a bine entry point for receiving a hop bine at the lower end, the apparatus further comprising:
   a pair of opposing guide plates near the bine entry point for guiding hop bines toward the entry point.

6. The apparatus of claim 1, wherein the inside edges of the endless belts are scalloped.

7. The apparatus of claim 1, wherein the gap is defined by a link chain secured along the length of the inside edge of each endless belt, the link chain adapted to allow the passage of the bine while blocking the passage of the plant material.

8. An apparatus for removing plant material from a plant body, comprising:
   an inclined conveyor-stripper assembly comprising a pair of moving adjacent endless belts adapted to carry removed plant material to a collection point, each belt having an inside edge, the inside edges defining a gap between the belts sized to allow the passage of the plant body but not the plant material;
   a pair of counter-rotating tires positioned below the belts for grasping and continuously pulling the plant body downwardly through the gap.

9. The apparatus of claim 8, wherein the gap is defined by a link chain affixed along the length of each belt inside edge.

10. The apparatus of claim 8, wherein the adjacent endless belts form a "V" configuration with the gap at the vertex of the "V".

11. A method for removing plant material from a plant body using the apparatus of claim 8, the method comprising engaging the counter-rotating tires to grasp and pull the plant body downwardly through the gap between the moving adjacent endless belts.

12. The method of claim 11, further comprising the step of conveying the removed plant material on the endless belts to a collection point.

13. A method for harvesting hops using the apparatus of claim 1, the method comprising engaging the grasping and pulling means to pull a hop bine downwardly through the gap to strip plant material from the hop bine and leave the plant material on the moving endless belts to be carried to a collection point.

14. A method for harvesting hops using the apparatus of claim 2, the method comprising engaging the grasping and pulling means to pull a hop bine downwardly through the gap to strip plant material from the hop bine and leave the plant material on the moving endless belts to be carried to a collection point.

15. The method of claim 14 wherein the hop bine has a root end growing from a root, and a trellis end attached to an overhead horizontal trellis, comprising the additional steps of:
   severing the root end of the hop bine from the root, to allow the hop bine to hang vertically from the trellis;
   bringing the hop bine into proximity with the gap in the moving belts;
   grasping the hop bine in the gap between the moving belts;
   moving the hop bine with the belts to the contact point of the counter-rotating tires;
   severing the trellis end of the hop bine; and,
   grasping the hop bine between the counter-rotating tires.

* * * * *